(12) United States Patent
Rizzo et al.

(10) Patent No.: US 8,065,226 B2
(45) Date of Patent: Nov. 22, 2011

(54) METHOD AND SYSTEM FOR PERFORMING A CASH TRANSACTION WITH A SELF-SERVICE FINANCIAL TRANSACTION TERMINAL

(75) Inventors: Carol J. Rizzo, Livingston, NJ (US); Phoebe Rin-Rin Hsu, Northridge, CA (US); Michael L. Sears, Torrance, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 2638 days.

(21) Appl. No.: 09/908,549

(22) Filed: Jul. 20, 2001

(65) Prior Publication Data

US 2002/0069170 A1 Jun. 6, 2002

Related U.S. Application Data

(60) Provisional application No. 60/219,768, filed on Jul. 20, 2000.

(51) Int. Cl.
*G06Q 40/00* (2006.01)

(52) U.S. Cl. .......................... 705/39; 705/35

(58) Field of Classification Search .............. 705/35, 705/39–44
See application file for complete search history.

(56) References Cited

U.S. PATENT DOCUMENTS

| | | | |
|---|---|---|---|
| 3,826,344 A | 7/1974 | Wahlberg | 194/2 |
| 4,114,027 A | 9/1978 | Slater et al. | 705/43 |
| 4,321,672 A | 3/1982 | Braun et al. | 235/379 |
| 4,341,951 A | 7/1982 | Benton | 235/379 |
| 4,498,000 A | 2/1985 | Decavele et al. | 235/380 |
| 4,529,870 A | 7/1985 | Chaum | 35/380 |
| 4,707,592 A | 11/1987 | Ware | 35/379 |
| 4,766,293 A | 8/1988 | Boston | 235/379 |
| 4,773,001 A | 9/1988 | Blair et al. | 364/200 |
| 4,926,368 A | 5/1990 | Morita et al. | 364/715 |
| 5,012,076 A | 4/1991 | Yoshida | 235/379 |
| 5,025,373 A | 6/1991 | Keyser, Jr. et al. | 364/408 |
| 5,157,717 A | 10/1992 | Hitchcock | 379/96 |
| 5,220,501 A | 6/1993 | Lawlor et al. | 364/400 |
| 5,231,662 A | 7/1993 | Van Rumpt et al. | 380/9 |
| 5,255,305 A * | 10/1993 | Sattar | 379/32.01 |
| 5,326,960 A * | 7/1994 | Tannenbaum | 235/379 |
| 5,336,870 A | 8/1994 | Hughes et al. | |
| 5,350,906 A * | 9/1994 | Brody et al. | 235/379 |
| 5,367,561 A | 11/1994 | Adler et al. | 379/93 |
| 5,424,938 A | 6/1995 | Wagner et al. | 364/408 |
| 5,440,634 A | 8/1995 | Jones et al. | 380/24 |

(Continued)

OTHER PUBLICATIONS

PCT Written Opinion for International Application No., PCT/US01/22888, mailed Aug. 9, 2002.

(Continued)

*Primary Examiner* — Elda Milef
(74) *Attorney, Agent, or Firm* — Eric L. Sophir; SNR Denton US LLP

(57) ABSTRACT

A method and system for performing a cash transaction with a self-service financial transaction terminal makes use of computer hardware and software that allows a financial institution cardholder to authorize a recipient to withdraw a specified amount of cash at an ATM of the particular financial institution. The cardholder can set up the transaction, for example, from any telephone using an interactive voice response (IVR) system, or by utilizing the application at a financial institution ATM, or by using an Internet website application. The originator can set up the recipient's ATM transaction to be either cardless or card-initiated.

2 Claims, 8 Drawing Sheets

U.S. PATENT DOCUMENTS

| | | | |
|---|---|---|---|
| 5,448,043 A | 9/1995 | Nakano et al. | 235/379 |
| 5,455,407 A | 10/1995 | Rosen | 235/380 |
| 5,457,305 A | 10/1995 | Akel et al. | 235/379 |
| 5,465,206 A | 11/1995 | Hilt et al. | 364/406 |
| 5,524,073 A | 6/1996 | Stambler | 380/24 |
| 5,550,358 A | 8/1996 | Tait et al. | 235/380 |
| 5,590,196 A | 12/1996 | Moreau | 380/18 |
| 5,650,604 A * | 7/1997 | Marcous et al. | 235/379 |
| 5,659,165 A * | 8/1997 | Jennings et al. | 235/379 |
| 5,661,781 A * | 8/1997 | DeJager | 379/144.07 |
| 5,677,955 A | 10/1997 | Doggett et al. | 380/24 |
| 5,825,003 A | 10/1998 | Jennings et al. | 235/379 |
| 5,903,881 A | 5/1999 | Schrader et al. | 705/42 |
| 5,913,203 A | 6/1999 | Wong et al. | 705/39 |
| 5,915,023 A | 6/1999 | Bernstein | 380/24 |
| 5,937,396 A | 8/1999 | Konya | 705/43 |
| 5,963,647 A * | 10/1999 | Downing et al. | 705/39 |
| 6,081,792 A | 6/2000 | Cucinotta et al. | |
| 6,142,369 A | 11/2000 | Jonstromer | |
| 6,173,269 B1 * | 1/2001 | Solokl et al. | 705/35 |
| 6,505,178 B1 * | 1/2003 | Flenley | 705/43 |
| 7,096,003 B2 * | 8/2006 | Joao et al. | 455/406 |
| 7,720,754 B1 * | 5/2010 | Gutierrez-Sheris | 705/39 |
| 2002/0013711 A1 * | 1/2002 | Ahuja et al. | 705/1 |

OTHER PUBLICATIONS

PCT International Search Report for International Application No. PCT/US01/22888. mailed Oct. 10, 2001.

PCT International Preliminary Examination Report for International Application No. PCT/US01/22888, mailed Jun. 26, 2003.

* cited by examiner

METHOD AND SYSTEM FOR PERFORMING A CASH TRANSACTION WITH A SELF-SERVICE FINANCIAL TRANSACTION TERMINAL

PRIORITY APPLICATION

This application claims the benefit of U.S. Provisional Application No. 60/219,768 filed Jul. 20, 2000, entitled "Method and System for Performing a Cash Transaction With a Self-Service Financial Transaction Terminal (Phone Cash)," which is incorporated herein by this reference.

CROSS REFERENCE TO RELATED APPLICATIONS

This application relates to U.S. patent application Ser. No. 09/378,961 filed Aug. 23, 1999, entitled "Method and System For Transferring Funds From An Account To An Individual," which is incorporated herein by this reference.

FIELD OF THE INVENTION

The present invention relates generally to the field of self-service financial transaction terminals and more particularly to a method and system for performing a cash transaction with a self-service financial transaction terminal or automatic teller machine (ATM).

BACKGROUND OF THE INVENTION

It is not currently possible for the holder of an ATM transaction card to authorize another person, such as a non-cardholder who does not have a banking relationship with the cardholder's bank, to get cash from the cardholder's checking account, such as the cardholder's demand deposit checking account or other account of the cardholder, at an ATM. Even though the other person may have banking relationships with one or more banks other than the cardholder's bank, the cardholder cannot authorize a transfer of cash from his or her checking account through an ATM transaction to the other person who does not have access to the cardholder's checking account. There is a present need for a way to enable a transaction cardholder to authorize another person to withdraw a specified amount of cash from the cardholder's bank account at an ATM of the cardholder's bank, for example, to make a cash payment to the other person.

SUMMARY OF THE INVENTION

It is a feature and advantage of the present invention to provide a method and system for performing a cash transaction with an ATM that enables a transaction cardholder to authorize another person to withdraw a specified amount of cash from the cardholder's bank account at any ATM of the cardholder's bank, for example, to make a cash payment to the other person.

It is another feature and advantage of the present invention to provide a method and system for performing a cash transaction with an ATM which enables the holder of an ATM transaction card to authorize another person who does not have a banking relationship with the cardholder's bank to get cash from the cardholder's checking account, such as the cardholder's demand deposit checking account or other account of the cardholder, at the ATM.

It is a further feature and advantage of the present invention to provide a method and system for performing a cash transaction with an ATM that enables the cardholder-originator to set up the ATM transaction for another person to withdraw cash, for example, from a telephone using an interactive voice response (IVR) system, an application on the ATM, or an Internet website application as an access portal.

It is an additional feature and advantage of the present invention to provide a method and system for performing a cash transaction with an ATM that allows the cardholder-originator to specify a time interval within which the recipient can pick up the cash at the ATM, such as immediately or at a later date and/or only between certain dates.

To achieve the stated and other features, advantages and objects of the present invention, an embodiment of the present invention utilizes computer hardware and software to provide a method and system for performing a cash transaction with a self-service financial transaction terminal which enables the holder of a bank's transaction card to authorize another person who is a non-cardholder-recipient to withdraw a specified amount of cash at any ATM within the bank's ATM system. The cardholder-originator can set up the transaction, for example, from a telephone using an IVR system, or utilizing an application on the ATM, or using an Internet website application. The originator can set up the recipient's ATM transaction to be either cardless or card initiated.

In the method and system for an embodiment of the present invention, the originator is allowed to access a financial institution server, such as an interactive voice response server, via an access portal, such as a telephonic device. Alternatively, the originator is allowed to access the financial institution server, for example, via an input device at a self-service financial transaction terminal of the financial institution, such as an ATM, or via an Internet website application. The IVR server receives the originator's transaction card number and personal identification number via entry, for example, on a telephone keypad. The IVR server then notifies the originator of a balance of a financial institution account of the originator and allows the originator to enter a selection of a transfer option from a voice menu of the IVR server.

Upon entry of the originator's selection of the transfer option, the financial institution server receives recipient identification information entered by the originator via the access portal in response to prompts. The recipient identification information includes, for example, either a transaction card number for the recipient, if the originator selects a transaction card initiated transaction option for the recipient, or a cardless identifier for the recipient, if the originator selects a cardless transaction option for the recipient. The transaction card number can be, for example, a credit card number or an ATM card number for the recipient, and the cardless identifier can be an alphabetic, numeric, or alphanumeric identifier known to the recipient.

Upon receipt of the recipient identification information, the transaction terminal server confirms the information to the originator via the access portal. In addition, the originator can specify one or more predefined parameters for withdrawal of the cash by the recipient, such as a predetermined time period within which the withdrawal of the cash by the recipient is allowed or an enabling event, such as a telephone call, upon which withdrawal of the cash by the recipient is conditioned. On receiving the recipient identification information, the financial institution server randomly generates and furnishes the originator a unique authentication code associated with the recipient identification information via the access portal.

Thereafter, in response to prompts, the financial institution server receives a designation from the originator via the access portal of an amount of cash authorized for withdrawal by the recipient at any one of a number of financial institution transaction terminals or ATMs, as well as a source account for the authorized cash withdrawal, such as a checking account, savings account, or credit card account of the originator. The amount of cash authorized for withdrawal is immediately deducted from the source account and held in a temporary account pending withdrawal of the cash by the recipient. The financial institution server confirms the designated amount of cash authorized for withdrawal to the originator and offers the originator an option to cancel.

In addition, the originator is offered a selection of options of whether or not the originator is to be notified when the authorized cash is withdrawn by the recipient. If the originator selects the notification option, contact information for the originator, such as a telephone number, fax number, or an email address for the originator, is received from the originator in response to prompts, and the financial institution server confirms the contact information to the originator via the access portal. Thereafter, the financial institution server notifies the originator that the authorized cash is available for withdrawal by the recipient at any one of the plurality of financial institution transaction terminals or ATMs.

If the originator furnished a transaction card number for the recipient, the originator is notified of a requirement for the recipient to dip a transaction card associated with the transaction card number and to enter the unique authentication code at the transaction terminal for withdrawal of the cash. On the other hand, if the originator furnished a cardless identifier for the recipient, the originator is notified of a requirement for the recipient to enter the cardless identifier and the unique authentication code at the transaction terminal for withdrawal of the cash. In addition, if the originator selected the option for notification when the authorized cash is withdrawn by the recipient, the originator is reminded that a confirmation call will be made to the originator when the cash is withdrawn.

Assuming that the recipient is made aware of the availability of the authorized cash for withdrawal, the authentication code, and the particular recipient identification information furnished by the originator, the recipient can withdraw the cash at any one of a number of financial institution transaction terminals or ATMs. At the transaction terminal or ATM, the recipient enters the unique authentication code generated by the financial institution server and the recipient identification information that was furnished by the originator. The authentication code and recipient identification information are verified by a financial institution back office server, and the back office server confirms a transaction pending for the cash withdrawal based on the verification and authorizes the recipient's withdrawal of the cash to the transaction terminal or ATM. If the originator selected the option for notification of the withdrawal, the originator is also notified, for example, of the date and location of the withdrawal.

Additional objects, advantages and novel features of the invention will be set forth in part in the description which follows, and in part will become more apparent to those skilled in the art upon examination of the following or may be learned by practice of the invention.

BRIEF DESCRIPTION OF THE ATTACHMENTS

DETAILED DESCRIPTION

Referring now to an embodiment of the invention, an example of which is illustrated in the accompanying drawings, the method and system for an embodiment of the present invention allows a financial institution cardholder to authorize a non-cardholder-recipient to withdraw a specified amount of cash at an ATM of the particular financial institution. The cardholder can set up the transaction, for example, from any telephone using an interactive voice response (IVR) system, or by utilizing the application at a financial institution ATM, or by using an Internet website application for an embodiment of the invention. The originator can set up the recipient's ATM transaction to be either cardless or card-initiated.

Figure 1:
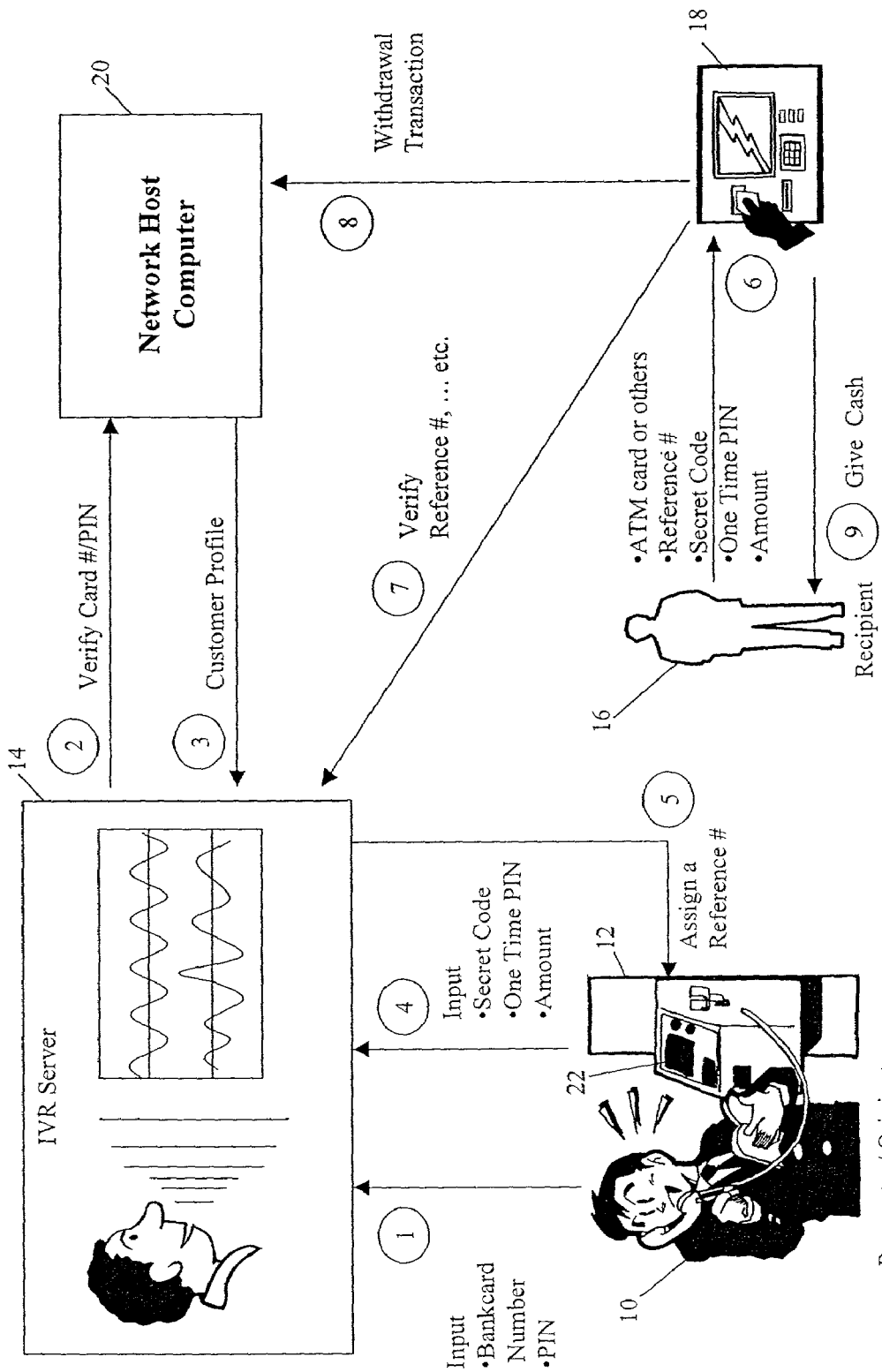
FIG. 1 is a schematic diagram which illustrates an overview example of key components and the flow of information between key components of the system for an embodiment of the present invention utilizing an IVR application.

FIG. 1 is a schematic diagram which illustrates an overview example of key components and the flow of information between key components of the system for an embodiment of the present invention utilizing, for example, an IVR application. Referring to FIG. 1, in the IVR aspect, the originator 10 at a telephone 12 sets up a transaction against his or her account as a type of future transaction, and is assigned an authorization code and other identifying information. Other access portals for setting up the transaction include, for example, through the Internet and through the ATM machine itself. The transaction is set up with a bank IVR server 14 which prompts the originator via the telephone 12, Internet or ATM access portal for the amount of the transfer and identifying information for the recipient 16 exactly as it will be entered by the recipient 16, such as numbers, letters, or the like, or a credit card or ATM card number. The identifying information for the recipient 16 will not allow the recipient 16 to access the originator's account but serves to identify the recipient 16. The bank IVR server 14 records that information.

In an embodiment of the present invention the originator 10 is able to specify, for example, a time interval within which the recipient can pick up the cash at an ATM 18, such as immediately or at a later date and/or only between certain dates. Thus, the cash can be set up for withdrawal by the recipient 16 subject to date restrictions, if any. Once the originator 10 sets up the ATM transaction for the recipient 16, all that the recipient 16 is required to do is to go to an ATM 18, identify himself or herself using a unique identification code that was issued when the transaction was set up, and the recipient 16 can withdraw the cash or a portion of the cash. Another aspect of an embodiment of the present invention is that once the cash is withdrawn by the recipient 16, a verification or confirmation telephone call is placed to the originator 10 who set up the transaction, giving the date, time and location of the ATM 18 at which the cash was withdrawn.

When the originator 10 sets up the authorization for the cash transaction for an embodiment of the present invention, the amount of cash specified by the originator 10 for the transfer plus a fee is immediately withdrawn from the source account designated by the originator 10. The specified amount of cash is then put into a transaction or escrow account, which is a temporary account awaiting pick-up by the recipient 16. The recipient 16 is not limited to picking up the cash at a specific ATM but can pick up the cash at any ATM in the bank's ATM system. The recipient 16 must identify himself or herself at the ATM 18 using the unique identification information that was provided by the originator 10.

In an embodiment of the present invention, once the recipient 16 enters the identification information at the ATM 18, the unique identification information is recognized by the bank's network host computer 20, which then confirms a transaction pending in the transaction account and authorizes the cash withdrawal to the ATM. As far as the ATM 18 is concerned, the ATM 18 has simply performed a normal cash withdrawal application, albeit against an escrow account or a temporary account with the bank. Subject to applicable rules and regulations, the originator 10 can designate any linked account, such as a checking account, savings account, or possibly a credit card account, as the source of the funds for the withdrawal, depending on the customer and the customer profile.

Figure 2:
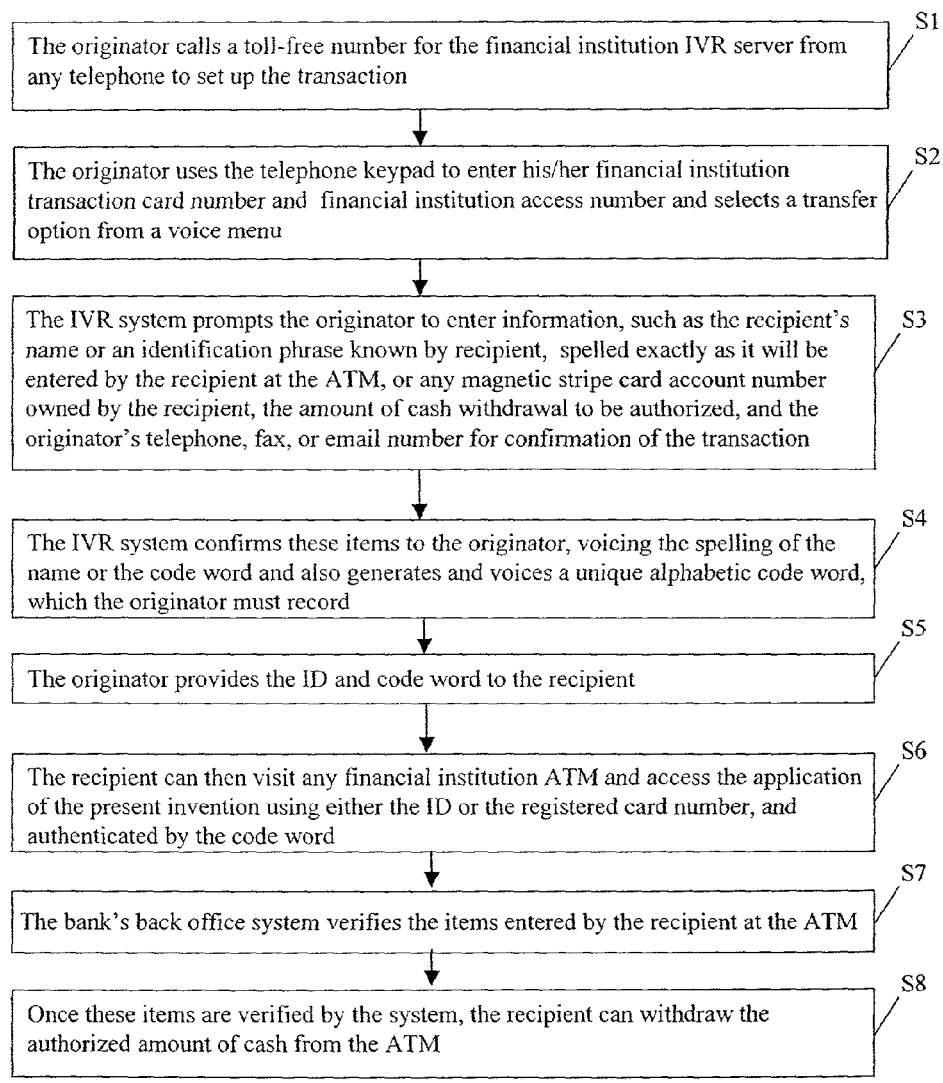
FIG. 2 is a flow chart which illustrates an example of process of arranging a special withdrawal transaction by telephone via the IVR application according to the method for an embodiment of the present invention.
Figure 3:
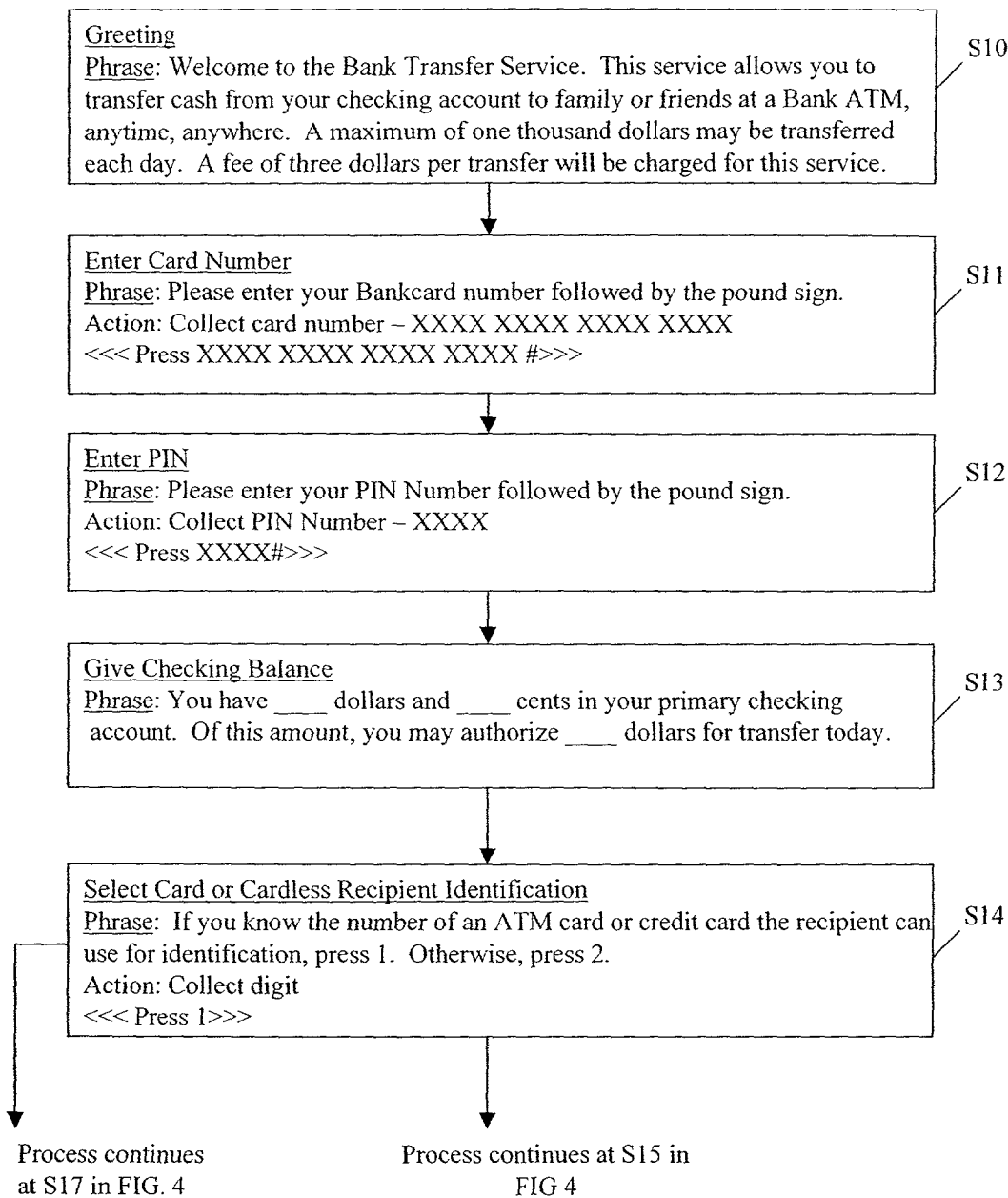
FIGS. 3-7 illustrate a sample IVR script for the process of requesting a special withdrawal transaction via telephone for an embodiment of the present invention.
Figure 4:
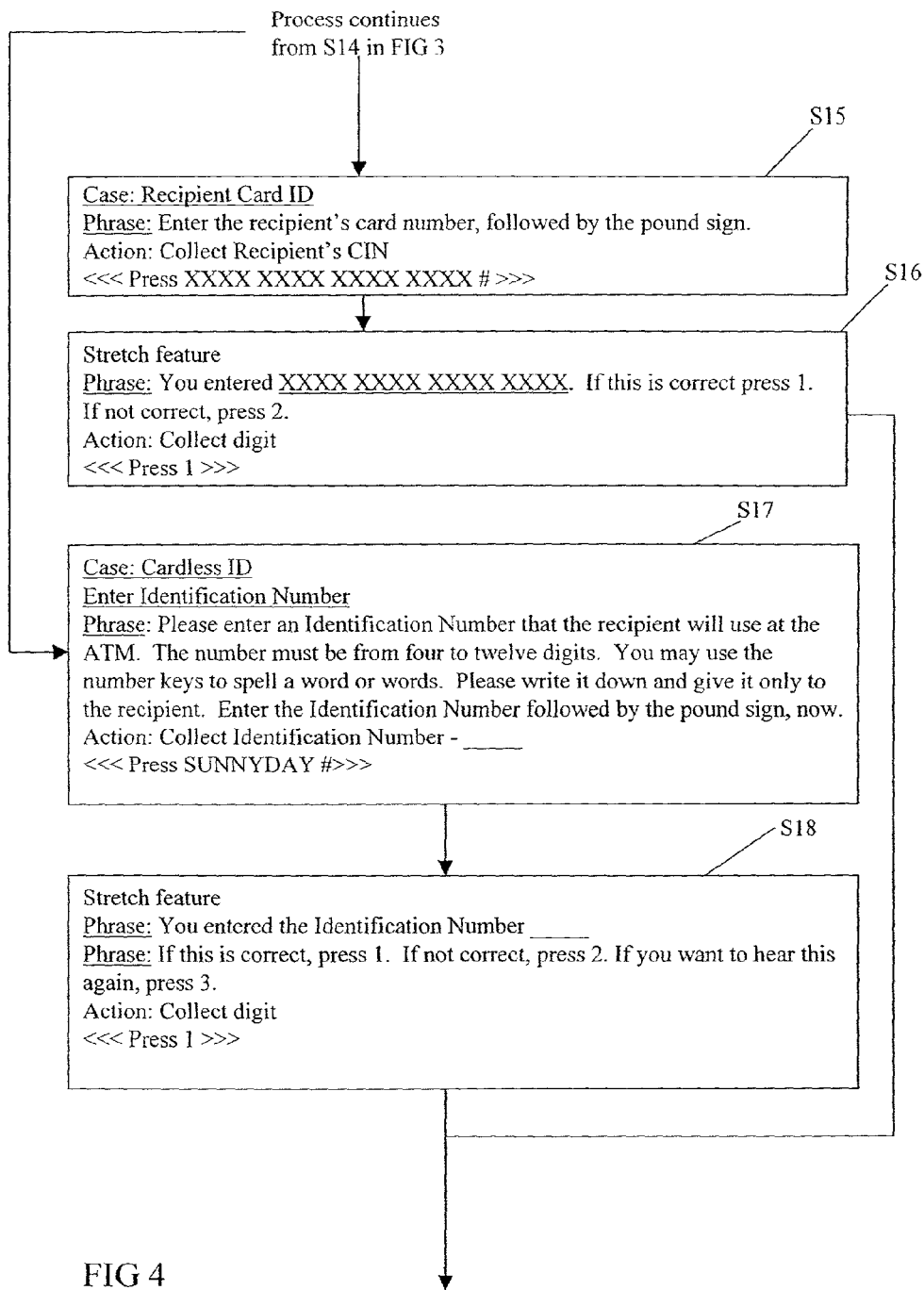
Figure 5:
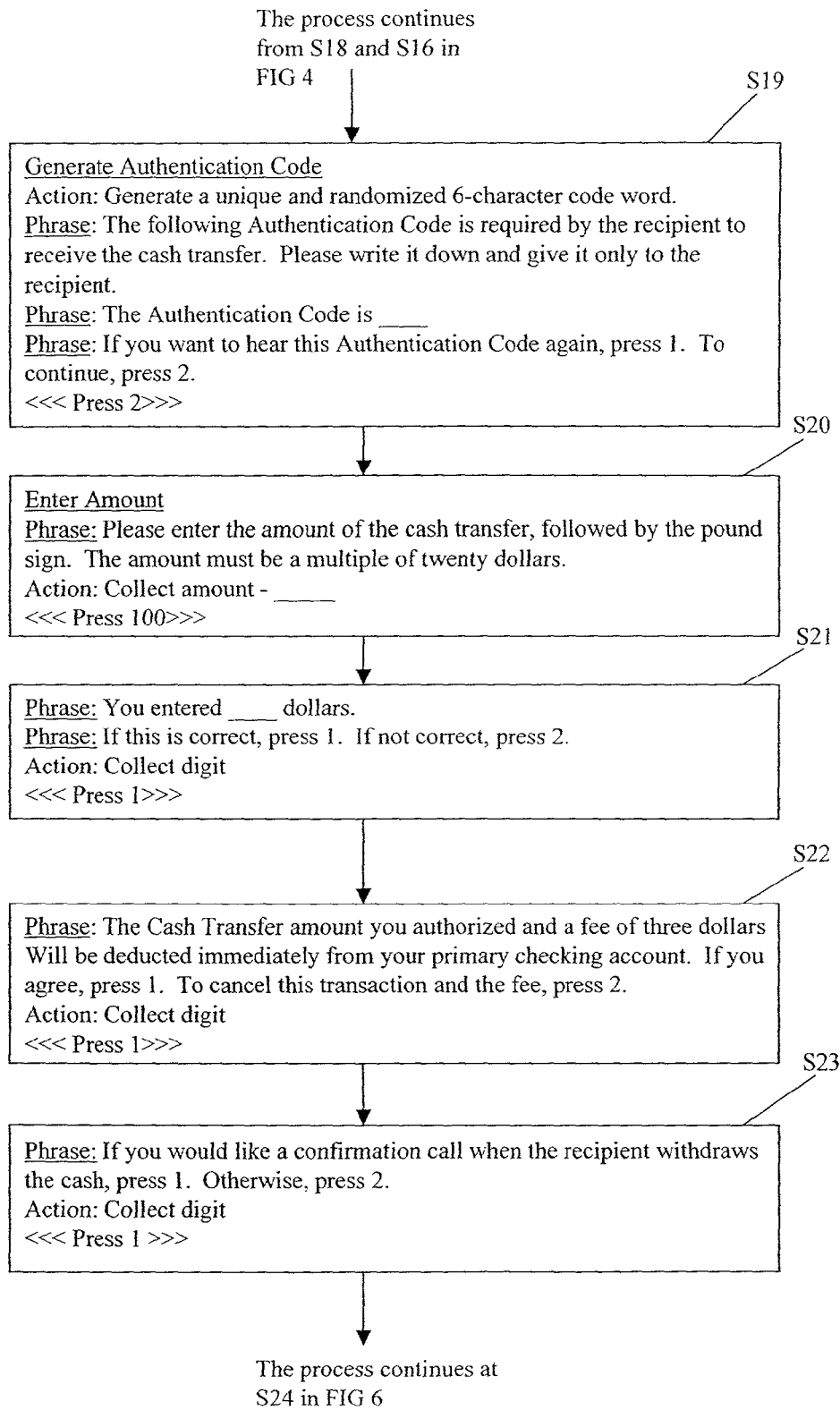
Figure 6:
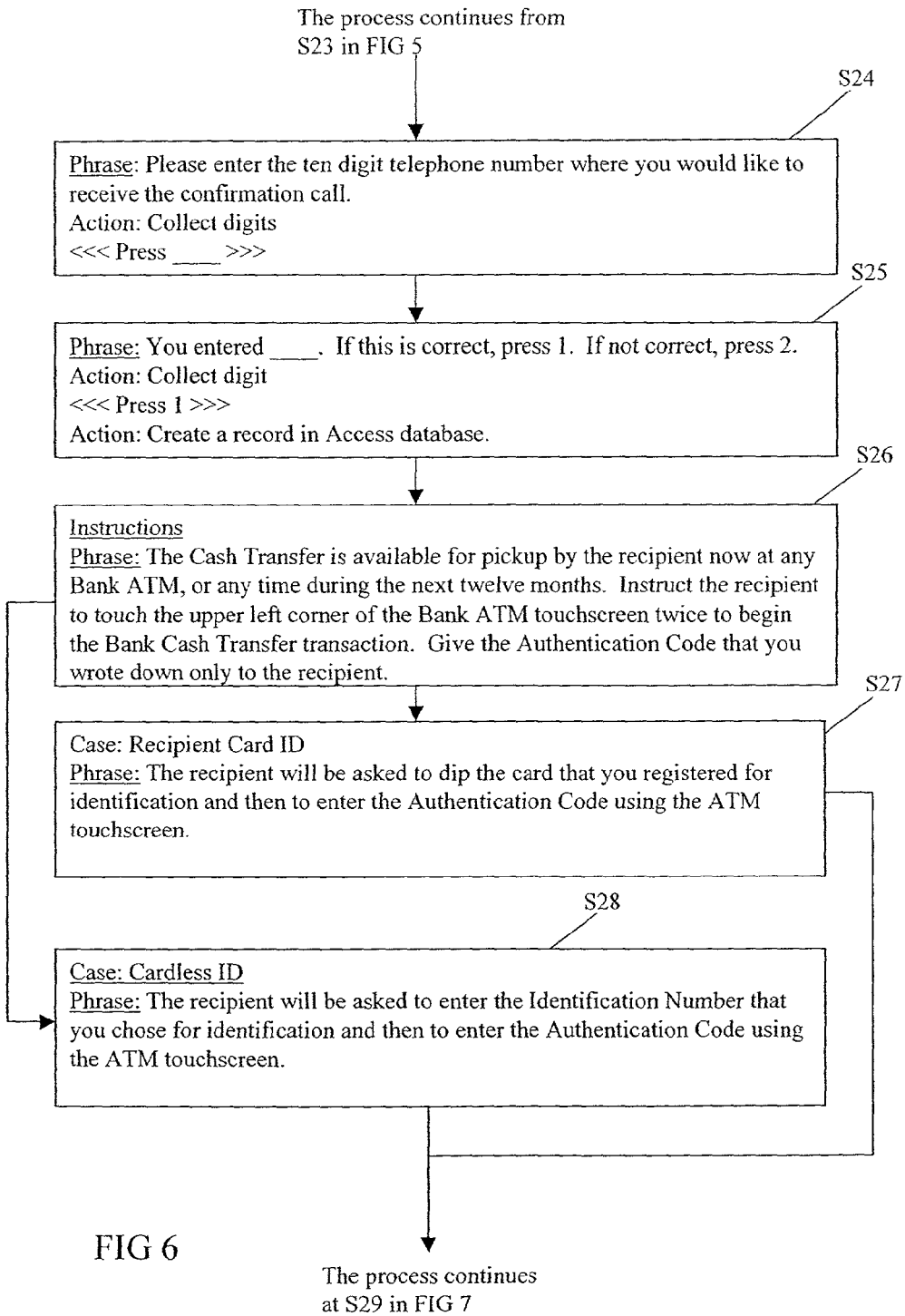
Figure 7:
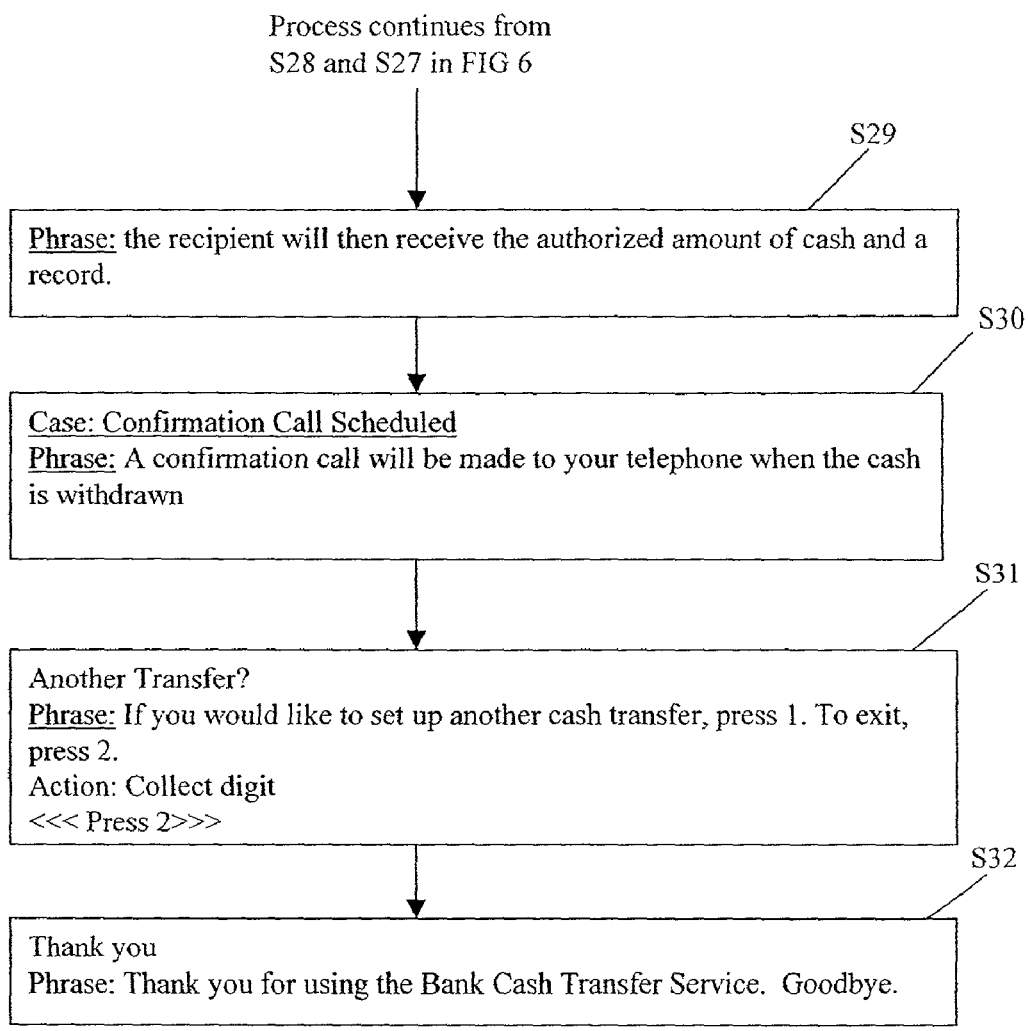

FIG. 2 is a flow chart which illustrates an example of the process of arranging a special withdrawal transaction by telephone via the IVR application according to the method for an embodiment of the present invention. Referring to FIG. 2, assume, for example, that the financial institution cardholder-originator 10 wishes to authorize the non-cardholder-recipient 16 to withdraw a specific amount of cash from a financial institution ATM 18, with the cash to be deducted from the originator's financial institution account. At S1, the originator 10 calls a toll-free number for the financial institution IVR server 14 from any telephone 12 to set up the transaction. At S2, the originator 10 uses the telephone keypad 22 to enter his/her financial institution transaction card number and financial institution access number and selects a transfer option from a voice menu. At S3, the IVR system 14 prompts the originator 10 to enter information, such as the recipient's name or an identification phrase known by recipient 16, spelled exactly as it will be entered by the recipient 16 at the ATM 18, or any magnetic stripe card account number owned by the recipient 16, the amount of cash withdrawal to be authorized, and the originator's telephone, fax, or email number for confirmation of the transaction Referring further to FIG. 2, at S4, the IVR system 14 confirms these items to the originator 10, voicing the spelling of the name or the code word. The IVR system 14 also generates and voices a unique alphabetic code word, which the originator 10 must record. At S4, the originator 10 provides the ID and code word to the recipient 16. At S5, the recipient 16 can then visit any financial institution ATM 18 and access the application for an embodiment of the present invention using either the ID or the registered card number, and authenticated by the code word. At S6, the bank's network host computer system 20 verifies the items entered by the recipient 16 at the ATM 18, and once these items are verified by the system 20, at S7, the recipient 16 can withdraw the authorized amount of cash from the ATM 18. In addition, the originator 10 can impose a valid pick-up date restriction, and the recipient 16 can make a withdrawal of a partial amount of the total authorized by the originator 10.

FIGS. 3-7 illustrate a sample IVR script for the process of requesting a special withdrawal transaction by telephone for an embodiment of the present invention. Referring to FIGS. 3-7, at S10, the originator 10 dials up the IVR number and is furnished information about the transfer service, and at S11, the originator 10 enters a bankcard number in response to a prompt. At S12, the originator 10 enters a PIN number in response to a prompt, and at S13, the originator 10 is notified of his or her checking account balance. At S14, the originator 10 is asked whether the recipient 16 will use the number of an ATM card or credit card for identification. If the originator 10 responds in the affirmative, at S15, the originator 10 enters the recipient's card number in response to a prompt, and at S16, the originator 10 is requested to confirm or correct the entered number. If, at S14, the originator 10 responded in the negative, at S17, in response to a prompt, the originator 10 enters an identification number that the recipient 16 will use at the ATM. At S18, the originator 10 is requested to confirm or correct the entered identification number.

Referring further to FIGS. 3-7, at S19, a unique and randomized authentication code is generated and furnished to the originator 10, and at S20, the originator 10 enters an amount of the cash transfer in response to a prompt. At S21, the originator 10 is requested to confirm or correct the entered amount, and at S22, the originator 10 is requested to confirm or cancel the transaction. At S23, the originator 10 is offered an option to be notified by telephone when the recipient 16 withdraws the cash, and if the response is affirmative, the originator 10 enters a telephone number at S24 and confirms or corrects the number at S25 in response to prompts. At S26, the originator 10 is advised that the cash is available to be picked up by the recipient 16.

Figure 8:
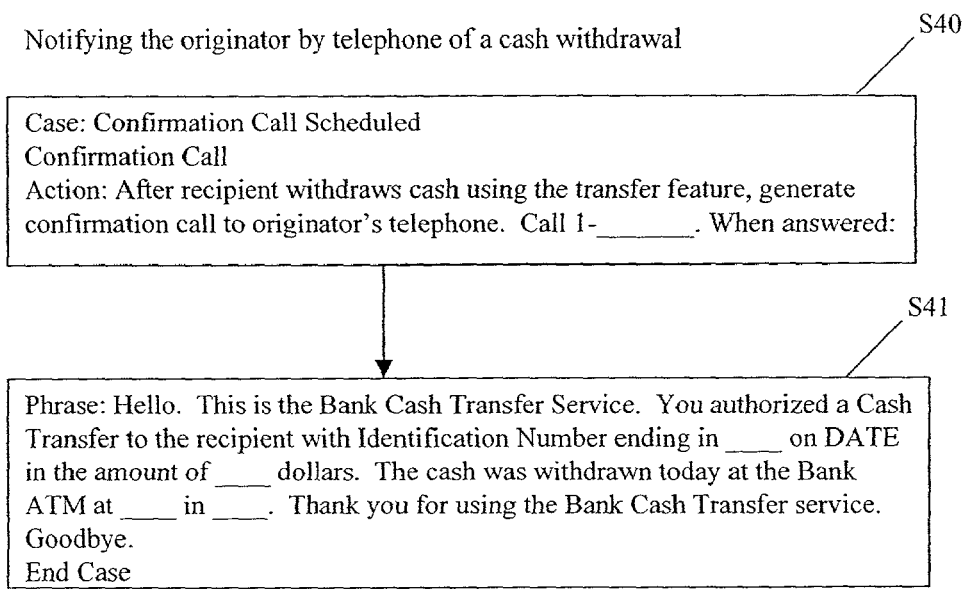
FIG. 8 is a sample IVR script for the process of notifying the originator by telephone of the cash withdrawal in the method for an embodiment of the present invention.

Referring again to FIGS. 3-7, if a card number for the recipient 16 was furnished at S15, at S27, the originator 10 is notified that the recipient 16 will be asked to dip the card and enter the authentication code to withdraw the cash at an ATM 18. Otherwise, if the originator 10 entered an identification number for the recipient 16 at S17, at S28, the originator 10 will be notified that the recipient 16 will be asked to enter the identification number and authentication code to withdraw the cash at an ATM 18. At S29, the originator 10 is notified that the recipient 16 will receive the authorized cash, and at S30, the originator 10 is notified that a confirmation call will be made to the originator 10 when the cash is withdrawn. At S31 the originator 10 is offered an opportunity to set up another cash transfer, and at S32, the session is concluded with a "Thank You." FIG. 8 is a sample IVR script for the process of notifying the originator 10 by telephone of the cash withdrawal in the method for an embodiment of the present invention. Referring to FIG. 8, at S40, after the recipient 16 withdraws the cash using the transfer service, the system generates a telephone call to the originator's telephone number. At S41, the originator 10 is notified that the cash was withdrawn and the date and location of the ATM 18 at which the cash was withdrawn.

An embodiment of the present invention facilitates various types of transfers or payments of cash, such as a transfer of cash by the originator 10 to his or her child-recipient 16 at college. For example, if a son or daughter of the originator 10 in college at a distant location needs $500 cash immediately, the system and method of the present invention provides a way for the son or daughter to pick up the cash with the convenience of a two-minute telephone call from his or her parent. Another example of use of the method and system of the present invention includes a householder who goes on a trip and forgets to leave money for the twice-weekly cleaning person. The householder-originator 10 can likewise arrange a pick-up of cash for the cleaning person-recipient 16 at the ATM 18. An additional example of use of an embodiment of the present invention includes settlement of a debt across country with a partner or business associate.

A further example of use of an embodiment of the present invention is payment to a seller in a transaction, such as an on-line auction. If the originator 10 places no restrictions on the pick-up by the recipient 16 of the cash at an ATM 18, the cash can be picked up virtually immediately. However, the buyer-originator 10 in an on-line auction transaction can specify a pre-determined delay, such as two days, on the pick-up time to allow the buyer-originator 10 to receive the purchased goods or the like. Further, instead of specifying a beginning date and an ending date for the permitted pick-up interval, an alternate embodiment of the present invention makes use of an enabling event, such as a telephone call or other message, from or on behalf of the originator 10 to actually enable the release of funds from the escrow.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for transferring cash from an originator's financial institution checking account to a financial institution escrow account for dispensing to a recipient at a financial institution self-service financial transaction terminal, comprising:

receiving, using a financial institution interactive voice response computer having a processor and memory, from an originator via a telephonic device without a card reader, keypad entry of the originator's financial institution transaction card number and personal identification number and the originator's selection of a transfer option from a voice menu to transfer cash from the originator's checking account to the financial institution escrow account for dispensing to the recipient at any of a plurality of self-service financial transaction terminals;

notifying the originator, using the financial institution interactive voice response computer, via the telephonic device, of a balance of the originator's financial institution checking account and a maximum amount of the balance of the originator's financial institution checking account available for dispensing to the recipient at any one of the plurality of financial institution self-service financial transaction terminals;

receiving, using the financial institution interactive voice response computer, from the originator via the telephonic device, recipient identification information comprising an alphabetic, numeric, or alphanumeric identifier associated with a transaction card of the recipient;

confirming to the originator, using the financial institution interactive voice response computer, via the telephonic device, the recipient identification information, and furnishing, using the financial institution interactive voice response computer, via the telephonic device, a unique authentication code associated with the recipient identification information to the originator, said recipient identification information and associated unique authentication code serving only to identify the recipient for dispensing of the cash in the financial institution escrow account to the recipient at any of the plurality of self-service financial transaction terminals without allowing the recipient access to any account of the originator;

receiving, using the financial institution interactive voice response computer, from the originator via the telephonic device, a designation of an amount of cash to be transferred from the originator's checking account to the financial institution escrow account for dispensing to the recipient at any one of the plurality of financial institution self-service financial transaction terminals;

transferring, using a financial institution back office computer having a processor and memory, the designated amount of cash from the originator's checking account to the financial institution escrow account for dispensing to the recipient at any of the plurality of self-service financial transaction terminals;

receiving, using the financial institution interactive voice response computer, from the originator via the telephonic device, a specification of predefined conditions for dispensing of the cash held in the financial institution escrow account to the recipient consisting of a beginning date that is later than a current date and an ending date defining a period of time during which the dispensing of the cash held in the escrow account to the recipient is allowed and a contractual enabling event, an occurrence of which the dispensing of the cash held in the escrow account to the recipient is conditioned during said period of time;

receiving, using the financial institution interactive voice response computer, from the originator via the telephonic device, a selection of an option for notification of the originator, and contact information consisting of least a telephone number or email address for the originator, when the cash held in the financial institution escrow account is dispensed to the recipient, confirming the contact information to the originator, using the financial institution interactive voice response computer, via the telephonic device, and notifying the originator, using the financial institution interactive voice response computer, via the telephonic device that a confirmation call will be made to the originator when the cash held in the financial institution escrow account is dispensed to the recipient;

receiving, using the financial institution back office computer, entry by the recipient of the cardless identifier and the unique authentication code at any one of the plurality of financial institution self-service financial transaction terminals, if the originator's selection of the cardless transaction option for the recipient was received or dipping by the recipient of a transaction card associated with the transaction card number of the recipient and entry by the recipient of the unique authentication code at any one of the plurality of financial institution self-service financial transaction terminals, if the originator's selection of the transaction card initiated transaction option for the recipient was received;

dispensing, using the financial institution back office computer, to the recipient all or a portion of the cash held in the financial institution escrow account up to the amount of cash transferred from the originator's checking account at said one of the plurality of financial institution self-service financial transaction terminals, according to the predefined parameters for dispensing of the cash held in the financial institution escrow account to the recipient consisting of the beginning date and the ending date defining the period of time during which the withdrawal of the cash held in the escrow account by the recipient is allowed and the contractual enabling event, the occurrence of which the withdrawal of the cash held in the escrow account by the recipient is conditioned during said period of time; and notifying the originator, using the financial institution interactive voice response computer, via the telephonic device of the dispensing of the cash held in the financial institution escrow account to the recipient and the amount dispensed and a date and a location of said one of the plurality of financial institution self-service financial transaction terminals of the dispensing by telephonic notification according to the contact information furnished by the originator.

2. A machine for transferring cash from an originator's financial institution checking account to a financial institution escrow account for dispensing to a recipient at a financial institution self-service financial transaction terminal, comprising:

a financial institution interactive voice response computer having a processor and memory, the processor being programmed for:

receiving from an originator, via a telephonic device without a card reader, keypad entry of the originator's financial institution transaction card number and personal identification number and the originator's selection of a transfer option from a voice menu to transfer cash from originator's checking account to the financial institution escrow account for dispensing to the recipient at any of a plurality of self-service financial transaction terminals;

notifying the originator, via the telephonic device, of a balance of the originator's financial institution checking account and a maximum amount of the balance of the originator's financial institution checking account available for dispensing to the recipient at any one of the plurality of financial institution self-service financial transaction terminals;

receiving recipient identification information from the originator via the telephonic device, wherein the recipient identification information comprises an alphabetic, numeric, or alphanumeric identifier associated with a transaction card of the recipient;

confirming to the originator, via the telephonic device, the recipient identification information, and furnishing a unique authentication code associated with the recipient identification information to the originator via the telephonic device, said recipient identification information and associated unique authentication code serving only to identify the recipient for dispensing of the cash in the financial institution escrow account to the recipient at any of the plurality of self-service financial transaction terminals without allowing the recipient access to any account of the originator;

receiving a designation from the originator, via the telephonic device, of an amount of cash to be transferred from the originator's checking account to the financial institution escrow account for dispensing to the recipient at any one of the plurality of financial institution self-service financial transaction terminals a financial institution back office computer having a processor and memory, the processor being programmed for:

transferring the designated amount of cash from the originator's checking account to the financial institution escrow account for dispensing to the recipient at any of the plurality of self-service financial transaction terminals;

the financial institution interactive voice response computer processor being further programmed for:

receiving a specification of predefined conditions for dispensing of the cash held in the financial institution escrow account to the recipient consisting of a beginning date that is later than a current date and an ending date defining a period of time during which the dispensing of the cash held in the escrow account to the recipient is allowed and a contractual enabling event, an occurrence of which the dispensing of the cash held in the escrow account to the recipient is conditioned during said period of time;

receiving a selection from the originator, via the telephonic device, a selection of an option for notification of the originator, and contact information consisting of least a telephone number or email address for the originator, when the cash held in the financial institution escrow account is dispensed to the recipient, confirming the contact information to the originator via the telephonic device, and notifying the originator via the telephonic device that a confirmation call will be made to the originator when the cash held in the financial institution escrow account is dispensed to the recipient;

receiving entry by the recipient of the cardless identifier and the unique authentication code at any one of the plurality of financial institution self-service financial transaction, if the originator's selection of the cardless transaction option for the recipient was received; or dipping by the recipient of a transaction card associated with the transaction card number of the recipient and entry by the recipient of the unique authentication code at any one of the plurality of financial institution self-service financial transaction terminals, if the originator's selection of the transaction card initiated transaction option for the recipient was received;

the financial institution back office computer processor being further programmed for:

dispensing to the recipient all or a portion of the cash held in the financial institution escrow account up to the amount of cash transferred from the originator's checking account at said one of the plurality of financial institution self-service financial transaction terminals, according to the predefined parameters for dispensing of the cash held in the financial institution escrow account to the recipient consisting of the beginning date and the ending date defining the period of time during which the withdrawal of the cash held in the escrow account by the recipient is allowed and the contractual enabling event, the occurrence of which the withdrawal of the cash held in the escrow account by the recipient is conditioned during said period of time; and the financial institution interactive voice response computer processor being further programmed for:

notifying the originator of the dispensing of the cash held in the financial institution escrow account to the recipient and the amount dispensed and a date and a location of said one of the plurality of financial institution self-service financial transaction terminals of the dispensing by telephonic notification according to the contact information furnished by the originator.

* * * * *